Figure 1:
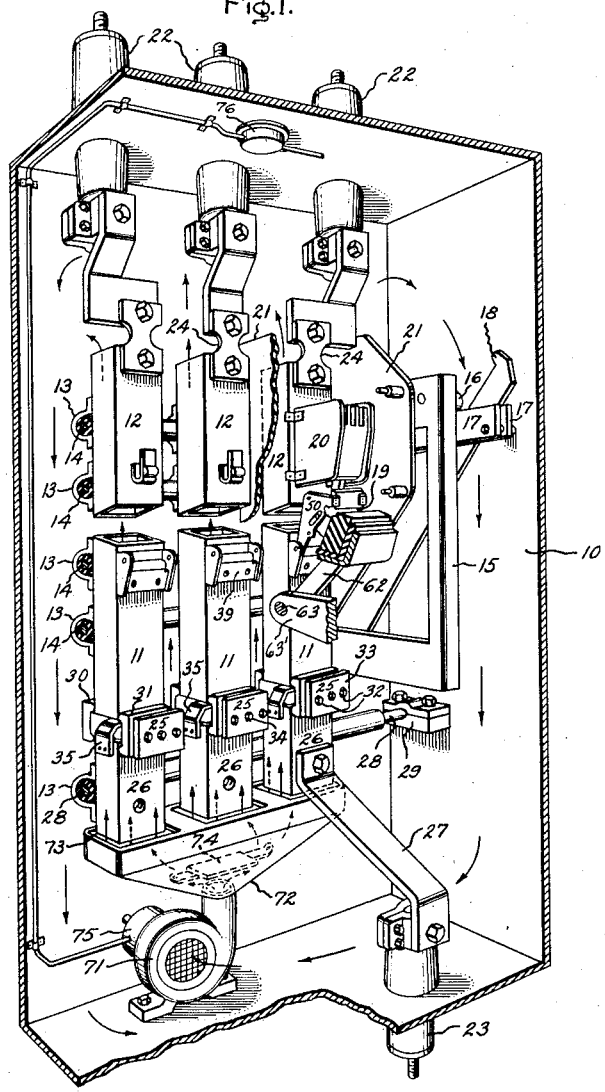

Nov. 17, 1942. J. W. SEAMAN 2,302,395
ELECTRIC SWITCHGEAR
Filed Nov. 27, 1940 3 Sheets-Sheet 1

Inventor:
Joseph W. Seaman,
by Harry E. Dunham
His Attorney.

Nov. 17, 1942.   J. W. SEAMAN   2,302,395
ELECTRIC SWITCHGEAR
Filed Nov. 27, 1940   3 Sheets-Sheet 2

Inventor:
Joseph W. Seaman,
by Harry E. Dunham
His Attorney.

Nov. 17, 1942.         J. W. SEAMAN                2,302,395
                    ELECTRIC SWITCHGEAR
          Filed Nov. 27, 1940          3 Sheets-Sheet 3

Inventor:
Joseph W. Seaman,
by Harry E. Dunham
His Attorney.

Patented Nov. 17, 1942

2,302,395

UNITED STATES PATENT OFFICE 2,302,395

ELECTRIC SWITCHGEAR

Joseph W. Seaman, Upper Darby, Pa., assignor to General Electric Company, a corporation of New York Application November 27, 1940, Serial No. 367,387

7 Claims. (Cl. 200—6)

My invention relates to improvements in electric switchgear and more particularly to improvements in switch-gear of the type known to the art as network protectors.

Over a period of several years, there has been developed, especially for metropolitan load centers, a system of low voltage alternating current distribution. The heart of this system is known to the art as a network protector. This protector embodies switchgear comprising a circuit breaker, operating mechanism therefor, relays for controlling the opening and closing of the circuit breaker, fuses, disconnecting devices, and miscellaneous items. There are two kinds of these protectors known respectively as the submersible and non-submersible types. The latter is usually mounted on a suitable supporting frame without any enclosing casing unless severe dirt conditions are encountered. For such conditions a dust-protective case is provided. The submersible protector is mounted in a watertight enclosing casing for application in vaults subject to flooding. Since these protectors, whether enclosed or not, are usually mounted in confined places, the problem of heating, while always present, is greatly accentuated in the submersible type. This is particularly so when the protector is subject to heavy duty and must have a high current capacity since it is subject to heavy current surges in case of faults on the network which are cleared more or less slowly by burning the network conductors or the blowing of fuses. Since this heating is largely local, as at contact points where certain unavoidable resistances occur, hot spots develop in critical places. Within certain limits, the effect of these can be compensated for by suitable design practice, but the cost becomes highly cumulative and the difficulties more pronounced as increased capacity is called for. Moreover, the problem of maintenance and inspection becomes more difficult and costly particularly as the protectors are usually placed in locations which are not readily accessible.

An object of my invention is to provide switchgear, particularly of the network protector type, which can safely satisfy the duty demanded without dangerous overheating. Another object of my invention is to avoid local hot spots and dissipate what heat is generated at a rate sufficient to avoid dangerous heating. A further object of my invention is to provide such switchgear on a simple, economical and practical basis. Still another object of my invention is to provide enclosed switchgear which requires only that reasonable amount of inspection and maintenance which experience over the years has shown advisable. These and other objects of my invention will hereinafter appear in more detail.

In accordance with my invention, I provide improved switchgear in which the parts are so constructed and arranged as to permit the maximum of free convection whereby to insure good heat dissipation particularly in switchgear which is not enclosed. Also, according to my invention, I so construct and arrange the various parts, especially the contacting surfaces, as to minimize local heating. Further, for completely enclosed switchgear, I provide, according to my invention, a forced circulation of the ambient within the housing so as to equalize the heating throughout the interior thereof and also to increase the heat dissipation from the walls of the housing. Moreover, in accordance with my invention, I provide improved switchgear, which is particularly adapted for heavy duty network protector service without dangerous heating and which can be built on an economically feasible basis.

My invention will be better understood from the following description when considered in connection with the accompanying three sheets of drawings.

Figure 2:
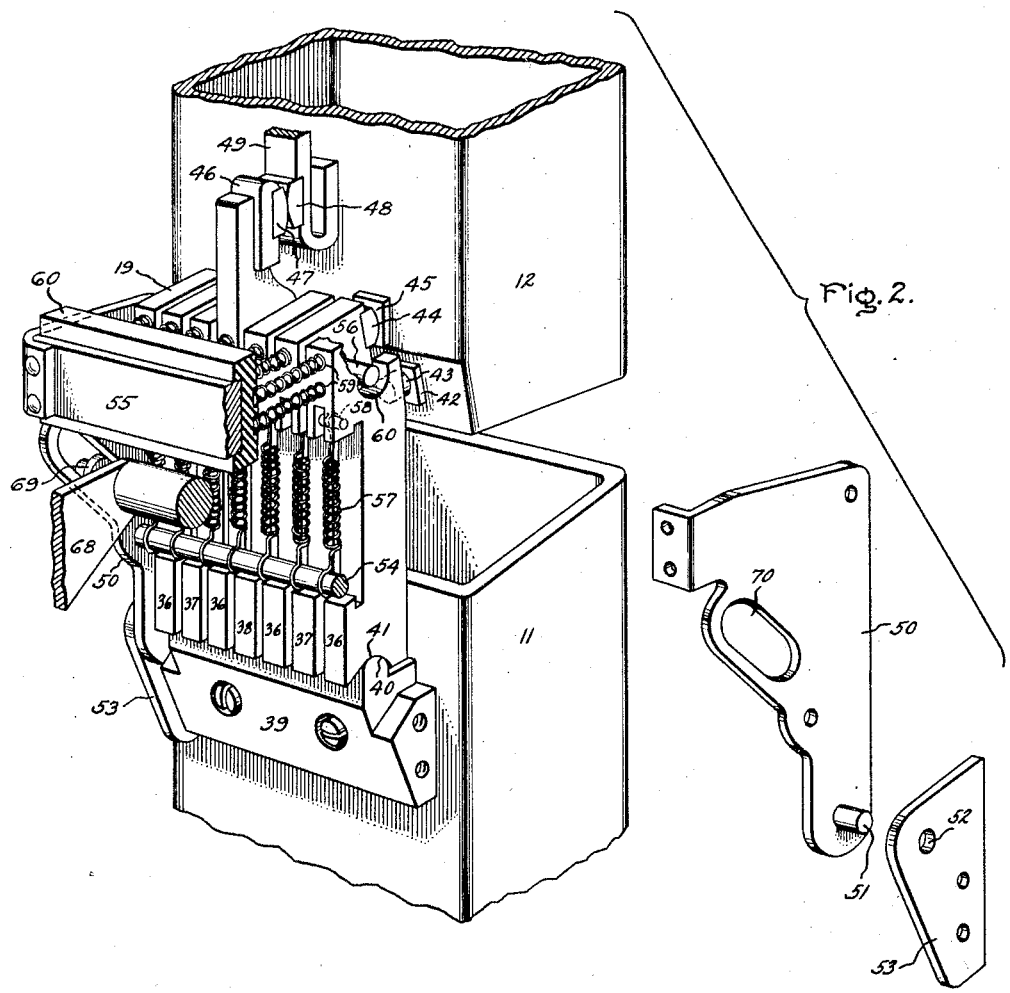
Figure 3:
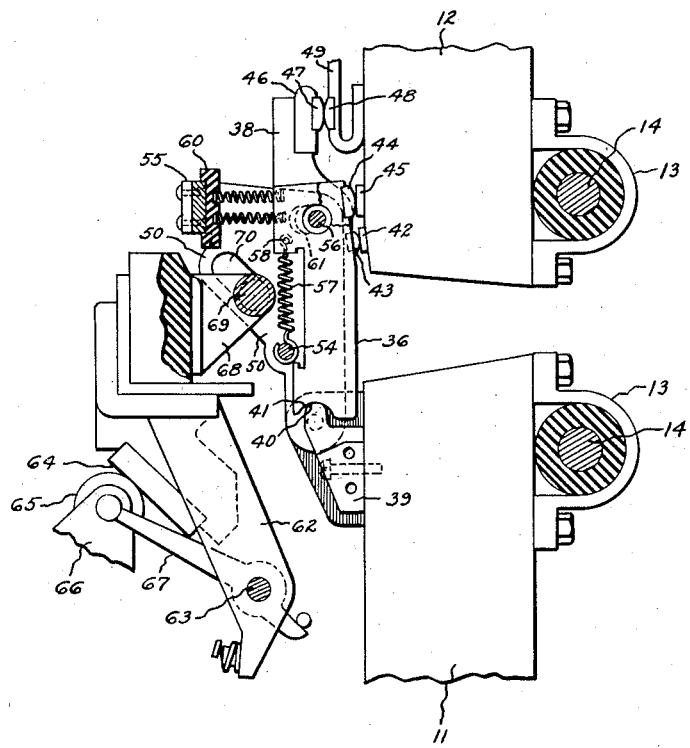

In the accompanying drawings Fig. 1 illustrates in perspective, with parts broken away for clearness, an embodiment of my invention in enclosed switchgear; Fig. 2 illustrates in exploded perspective a portion of the circuit breaker structure shown in the embodiment of my invention illustrated in Fig. 1; and Fig. 3 is a vertical elevation partially in section of the circuit breaker structure shown in Fig. 2.

In the embodiment of my invention shown in Fig. 1, I have illustrated switchgear structure and more particularly certain parts of a three-phase alternating current network protector as enclosed in a housing 10 which is partly broken away for clearness and from which the cover has been removed. For submersible protectors the cover structure may be analogous to that disclosed in United States Letters Patent 2,100,859, issued November 30, 1937, and assigned to the assignee of this invention.

As illustrated, the switch gear structure within the housing 10 comprises a plurality of electric current conducting members 11 and 12, one of each for each phase. These conductors are, in accordance with my invention, so constructed and arranged as to provide a free circulation of air in and around them. They may be tubular members and preferably their cross section is a hollow square, as shown, in order to provide the maximum cross sectional area of conducting material and also the maximum area of cooling surfaces for a given space consumption as well as to provide a channel of maximum cross sectional area for both free and forced convection currents. For the minimum resistance to the flow of such currents, the members are aligned, as shown. Further, in accordance with my invention, in order to facilitate the flow of air in and around the parts, the conductors 11 and 12 are supported on an open panel structure or framework. For example, they may be mounted by U-shaped clamps 13 on an open frame shown as comprising insulated rods 14. These rods are secured to a movable structure comprising side members 15, only one of which is shown. This structure or truck is movable on rollers 16 over a track comprising member 17 fastened to the housing and an extensible member 18 movable with the structure 15 to provide a track and bracket extending through the front of the housing 10 upon removal of the cover and withdrawal of the frame so as to provide ready access to the parts supported on the frame and also to facilitate replacement of a protector unit, when necessary.

In order to use the conductors 11 and 12 as part of a circuit breaker, their ends are spaced and arranged to be connected by a suitable bridging contact structure indicated generally by 19. The particular structure herein illustrated is disclosed and claimed in my copending application S. N. 367,386, filed November 27, 1940, and assigned to the assignee of this invention. This structure is shown in more detail in Figs. 2 and 3 and will be described in connection therewith. The circuit breaker may also include suitable arc extinguishing means indicated generally by 20. Also suitable insulating barriers 21 may be provided between the circuit breakers in the different phases. The housing 10 is also provided with suitable entrance bushings 22 and 23 shown respectively at the top and bottom of the housing. The bushings 22 to which the network is connected are shown as connected to the conductors 12 through suitable current responsive interrupting means, such as fuses 24. The bushings 23, which are connected to the feeder transformer, are shown as connected to the conductors 11 by suitable disconnecting devices 25. The particular disconnecting device illustrated is disclosed and claimed in the copending application of Benjamin E. Spiro, Serial No. 334,567, filed May 11, 1940, Patent No. 2,242,271, and assigned to the assignee of this invention. Whatever the connecting device employed, it is, according to my invention, arranged to close a gap between the conductor 11 and a similar conductor 26 which is in turn connected to the respective phase bushing by suitable means, such as a conducting strap 27, which may be of copper. The conductors 26 are mounted by U-shaped clamps 13 on an insulated rod 28 similarly to the conductors 11 and 12 and for the same reasons. The rod 28, however, is suitably supported on the housing walls as at 29.

As illustrated, the disconnecting device 25 comprises two bridging contact members 30 and 31 which are arranged to engage the conductors 11 and 26 in high pressure line contact. The desired pressure is obtained by threaded members 32, which extend through a backing plate 33 and engage the contact 30. When the pressure is released, contacts 30 and 31 may be lowered by turning an operating member 34 on which is eccentrically mounted a cylindrical cam supported between yoke members 35 in the gap between the ends of the conductors 11 and 26. It will be obvious that, by opening and lowering the disconnecting devices and disconnecting the fuse links 24 at their upper ends, the protector gear can be moved from the housing on its track supports or rails 17 and 18.

For maximum conductivity with a given operating force and also in order to avoid the use of flexible conductors, the bridging contact structure 19 comprises a plurality of contacting elements or bridging contacts 36, 37 and 38 which are arranged to bear on the lower conducting member 11 in substantially line contact for angular movement on the member 11 relatively to both of the members 11 and 12. For this purpose the member 11 is provided with a substantially cylindrical conducting portion in the form of a projecting contact member 39 having a cylindrical conducting surface 40. Each of the bridging contact elements 36, 37 and 38 is also provided with a substantially cylindrical contacting face 41 for engaging the cylindrical contacting surface 40 in line contact, as pointed out in my copending application supra, Serial No. 367,386. The angular extent of the cylindrical face 41 of the contacts 36, 37 and 38 is such as to prevent any possibility of the bridging contacts being moved out of engagement with the cylindrical surface 40 by shocks, jars, or heavy current surges through the switch.

As illustrated, the contact elements 36, 37 and 38 in the circuit closing position of the switch engage the member 12 in point and line contact. Thus the member 12 is provided with suitable planar contacting surfaces in the form of silver inserts 42 which are engaged by spherically faced contacts in the form of silver inserts 43 on the main bridging contacts 36. The plane surface of the contacting insert 42 may be inclined to the front face of the members 11 and 12 since this materially increases the current carrying capacity of the switch particularly under heavy current surges without damage to the switch parts. Certain of the bridging contacts 37 are arranged as secondary or transfer contacts to open following the opening of the main contacts 36. As shown, the bridging contacts 36 are provided with cylindrically faced contact inserts 44 which engage planar contacting surfaces 45 on the member 12 to provide line contact. The final break or arc interruption may be made by the bridging contact member 38 which, as illustrated, is arranged for line contact with the member 12. Thus, as shown, the upper end of the bridging contact 38 is provided with a high current carrying and heat absorbing insert 46 of copper or other suitable material in which is set a cylindrically faced contact 47 of high arc temperature resistant material. A similar cylindrically faced arcing contact 48 is suitably mounted on the member 12 as part of an arcing horn 49 so as to provide the desired blow-out effect.

The bridging contacts 36, 37 and 38 are mounted for substantially simultaneous movement to and from contacting engagement with the member 12 in such a way that the cylindrical surfaces 41 of the bridging contacts may move over the cylindrical face 40 of the contact portion 39 freely and keep these faces clean. As shown, this contact mounting means is a pivoted support whose pivotal axis is concentric with the axis of the cylindrical surface 40 of the contacting portion 39. This pivoted support comprises two side or frame members 50 each having a pivot 51 which fits in an opening 52 in side brackets 53. These brackets are suitably secured to the contacting portion 39 on the member 11.

For movement as a unit the side frame members 50 are rigidly secured to each other by a plurality of cross or tie members 54, 55 and 56. The tie member 54 constitutes a part of a mechanism which provides pressure at the line contacts of the elements 36, 37 and 38 with the contact surface 40. This pressure producing means includes suitable resilient elements, such as springs 57, one for each of the contact elements 35, 36 and 37 interconnecting the upper end of the element from a pin 58 to the cross member 54. The arrangement is such that the springs 57 carry substantially no current and are, accordingly, not affected by any direct heating effect. Also the pull of the springs 54 is exerted so closely in line with the contact between the surfaces 40 and 41 that substantially the full effect of the springs is available to maintain the necessary contact pressure. The springs also help to maintain the vertical alignment of the bridging contacts 36, 37 and 38.

For equalizing contact pressure at the upper ends of the contact elements 36, 37 and 38 and at the same time permitting the desired sequence of closing and opening of these contacts, suitable yielding or backing means, such as springs 59, are provided. These extend between an insulating member 60, carried by the cross member 55, and the upper ends of the contacts 36, 37 and 38. For more definite control and restraint of the motions of the upper ends of the bridging contacts 36, 37 and 38, the cross member 56 is arranged to extend through openings 61 in the upper ends of these contacts. In order to allow for the sequence of contact-making and breaking of the different contacts at their upper ends, these openings are of different sizes with respect to the relative magnitude of movement desired at the upper ends of the contact members.

It will be observed that in this contact structure the different bridging contact elements are spaced apart and that their supports and spring mechanism are likewise so separated as to provide ready circulation of air convection currents, whether free or forced. This materially aids in helping to maintain the switchgear structure at a minimum temperature for a given current carrying capacity.

For effecting the operation of the contact carrying mechanism to close the switch, any suitable type of operating mechanism, examples of which are well known to the art, may be employed. However, I have indicated in part a mechanism of the inclined plane and roller type, such as disclosed, for example, in United States Letters Patent 2,034,146 assigned to the assignee of this application. As shown, this mechanism comprises the supporting member 62 which is mounted on a shaft 63 and provided with an inclined face 64. This face is engaged by a roller 65 on a suitably actuated operating member 66 which is restrained by a prop 67 pivotally mounted on the shaft 63. The shaft 63 is suitably supported in bearing members 63' only one of which appears in Fig. 1. This operating mechanism will, of course, be mounted within the housing 10 so as to roll out with the circuit breaker parts in a manner which is well known to the art.

In the contact arrangement illustrated the axes of rotation of the supporting member 62 and the contacts 35, 36 and 37 are not concentric. The connection between the supporting member and the contact carrier is arranged to compensate for the difference in alignment of these axes by providing pivot carrying arms 68 on the supporting member 62 with pivots 69, which ride in slots 70, in the side frames 50.

With the structure and arrangement of parts herein described, it will be observed that conditions are most favorable to a maximum amount of free convection whereby to maintain the various parts at nearly the same temperature particularly when they are not in a completely enclosed housing. However, in the case of the submersible network protector where the housing has to be sealed against water, free convection may not be sufficient to maintain the parts at safe working temperatures particularly in high capacity current circuits and especially during fault surges. Accordingly, under these conditions, I provide forced convection, which is arranged to take advantage of the structure hereinbefore described so as to maintain the maximum flow of convection currents in a manner best adapted to effect the greatest cooling by radiation from the housing itself to the ambient without. Thus, in order to obtain this forced convection, I provide means for forcing the ambient within the housing from the bottom of the housing up through the tubular conductors 26, 11, 12 and around these conductors and also around the contact structure of the disconnecting devices, the circuit breaker elements and all gear in the housing. As illustrated, this means for obtaining a forced circulation of the ambient within the housing comprises a suitably driven blower 71 which may be arranged to discharge into a hood 72. As shown, this hood 72 is provided with openings 73 into the tubular conductors 26. These openings conform to the configuration of the conductors 26 and are preferably greater in area in order that the ambient may be forced not only through the interior of the hollow conductors but also up and around the outside in order to obtain the maximum forced convection. For equalization of flow through the three openings, the hood 72 may be provided with an internal baffle 74 suitably shaped and placed. The blower 71 may be continuously operated so as to obtain the maximum cooling at all times and it may be driven from an electric motor 75 which can be energized from the same source of current as is passing through the network protector. In order to reduce the cost of operation, the motor 75 may have its energization controlled in response to the temperature within the protector by suitable thermally responsive means such as a relay 76 which may be of the type disclosed in United States Letters Patent 1,190,061, issued July 4, 1916. For the illustrated arrangement the circulation of air upward through the interior and around the outside of the hollow conductors is indicated by arrows with their heads directed upwardly, and the air thus driven upwardly is forced down around the sides of the housing into intimate contact therewith to obtain the maximum heat transfer and thereby effect the utmost in cooling under the conditions involved.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. Electric switchgear comprising a fluid-tight housing, spaced frame members mounted in said housing, spaced tubular conductors mounted in vertical alignment on said frame members, a movable contact for bridging the gap between adjacent ends of said spaced conductors comprising a plurality of spaced conducting elements, and means within said housing for maintaining a forced circulation of the ambient within the housing through and around said conductors and said contact elements whereby to assist the natural circulation of the ambient within the housing and to maintain the temperature throughout the housing substantially uniform.

2. Electric switchgear comprising a fluid-tight housing, an open work supporting frame within said housing, spaced tubular conductors mounted vertically on said frame, spaced movable contacts for bridging the gap between adjacent ends of said spaced conductors, and means within said housing below said conductors for producing a forced circulation of the ambient within the housing through and around said conductors whereby to assist the natural circulation of the ambient within the housing to equalize the temperature in the housing by forced convection and thereby to minimize the hot spot temperature therein by radiation from the surface thereof.

3. Electric switchgear comprising a fluid-tight housing, spaced frame members mounted within said housing, spaced square tubular conductors mounted within said housing in vertical alignment on said frame members, and a plurality of spaced movable contacts for bridging the gaps between the ends of said spaced conductors, the arrangement of said frame members, conductors and contacts being such as to provide a free circulation of the ambient within said housing through and around said conductors whereby to equalize the temperature within said housing.

4. Electric switchgear comprising a fluid-tight housing and mounted therein a plurality of substantially parallel frame members, two spaced square tubular conductors vertically mounted on said frame members substantially in alignment, a plurality of spaced simultaneously movable contact elements for bridging the gap between adjacent ends of said spaced conductors, and air moving means within said housing at the bottom thereof for producing a forced circulation of the air within the housing upward through and around said conductors and said conductor elements whereby to assist the natural circulation of the air within the housing and to equalize the temperature in the housing by forced convection and thereby to minimize the hot spot temperature within the housing by radiation from the surface thereof.

5. Electric switchgear comprising a fluid-tight housing, spaced insulated supporting members mounted in said housing, spaced square tubular conductors vertically mounted within the housing on said supporting members, a movable contact for bridging the gap between adjacent ends of said spaced conductors comprising a plurality of spaced conducting elements, and air moving means mounted within the housing below said conductors for maintaining a forced circulation of the air within said housing upward through and around said conductors and said contact elements whereby to assist the natural circulation of the air within the housing and to equalize the temperature throughout the housing.

6. A submersible protective device for electric current distribution systems comprising a fluid-tight housing, spaced frame members mounted within said housing, spaced square tubular conductors mounted within said housing in vertical alignment on said frame members, circuit interrupting means comprising a plurality of spaced movable contacts for bridging the gap between the adjacent ends of said spaced conductors, and a gaseous ambient within said housing, the arrangement of said frame members, conductors, and contacts being such as to provide a free circulation of the ambient within said housing through and around said conductors whereby to equalize the temperature within said housing.

7. A submersible network protector for low voltage alternating current electric systems comprising a fluid-tight housing, spaced insulated supporting members mounted within said housing, spaced square tubular conductors mounted within the housing in alignment on said supporting members, circuit interrupting means including a movable contact for bridging the gap between adjacent ends of said spaced conductors, said contact comprising a plurality of spaced conducting elements, and air moving means mounted wholly within said housing below said conductors for maintaining a forced circulation of the air within the housing upward through and around said conductors and said contact elements whereby to assist the natural circulation of the air within the housing and to equalize the temperature throughout the housing.

JOSEPH W. SEAMAN.